E. F. MILLER.
METALLIC PACKING.
APPLICATION FILED OCT. 4, 1915.
1,201,488.
Patented Oct. 17, 1916.
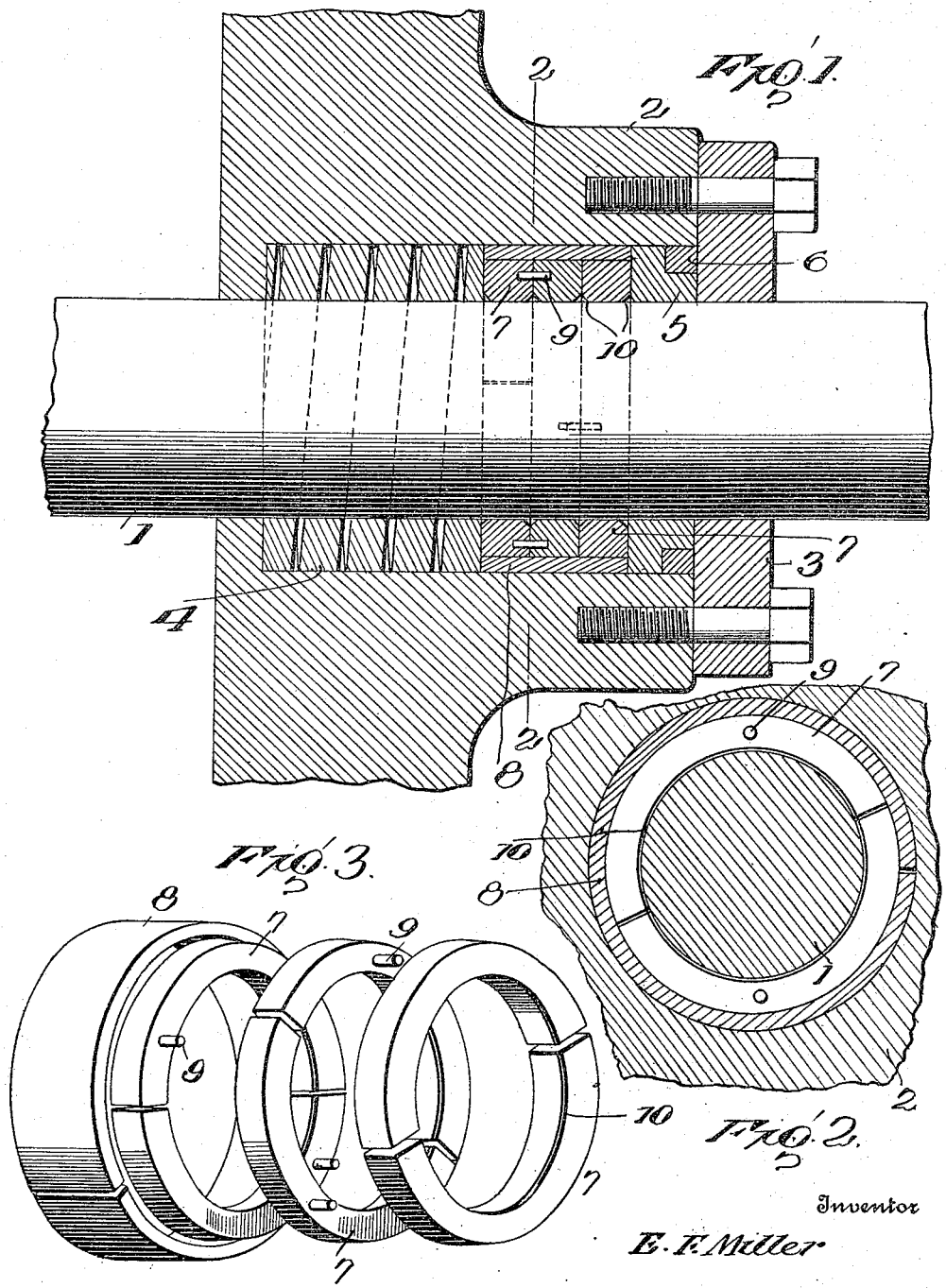
Inventor
E. F. Miller

UNITED STATES PATENT OFFICE.

EDWIN F. MILLER, OF RALEIGH, NORTH CAROLINA.

METALLIC PACKING.

1,201,488.  Specification of Letters Patent.  Patented Oct. 17, 1916.

Application filed October 4, 1915. Serial No. 54,002.

*To all whom it may concern:*

Be it known that I, EDWIN F. MILLER, a citizen of the United States, residing at Raleigh, in the county of Wake and State of North Carolina, have invented certain new and useful Improvements in Metallic Packings, of which the following is a specification.

The primary purpose of the invention is the provision of metallic packing adapted more particularly for super-heated locomotives. It is to be understood that the packing is adapted for piston rods, valve stems and the like parts subjected to extreme heat and which are required to preserve a close joint to prevent the escape of fluid.

The invention provides essentially a cast iron packing of sectional formation, the same being of a composite nature and embodying a plurality of sectional rings arranged to break joint and a confining ring possessing inherent resiliency and adapted to hold the parts comprising the sectional rings in proper position, the sectional rings being provided with means, such as dowels, to hold them in given relative positions, that is, with the joints disalined.

With these and other objects in view, my invention will be more fully described, illustrated in the accompanying drawings, and then specifically pointed out in the claim which is attached to and forms a part of this application.

In the drawings, Figure 1 is a sectional view of a metallic packing embodying the invention, showing the same in operative position; Fig. 2 is a detail section on the line 2—2 of Fig. 1; Fig. 3 is a detail perspective view of the packing, the several parts being separated and disposed in a group.

Corresponding and like parts are referred to in the following description and indicated in all the views of the drawings by the same reference characters.

The numeral 1 designates a rod which may be provided with a piston, valve or like part.

The numeral 2 designates a packing box through which the rod 1 passes and which is adapted to receive the packing, said box being closed at one end by means of a gland 3 which is secured to the packing box in any preferred way. A filler 4 is located within the inner end of the box 2 and may be of any construction and, as shown, consists of a helical spring, both ends of said filler being disposed in radial planes of the box to obtain a close bearing against the inner end of the box and the packing. A joint ring 5 is located within the outer end of the packing box and is adapted to obtain an extended bearing against the parts comprising the improved packing which is disposed between the filler 4 and the part 5. The ring 5 is composed of sections which are retained in proper position by means of a spring retaining ring 6.

The improved packing comprises a plurality of sectional rings 7 and a confining ring 8. The length of the confining ring 8 coincides with the combined length of the plurality of sectional rings 7. The confining ring 8 possesses inherent resiliency and is split to admit of a limited contraction and expansion. The sectional rings 7 are of like formation, each comprising at least two sections which, when assembled, are retained in place by means of the confining ring 8. The sectional rings 7 are disposed to break joint and are held in relative given position by means of dowels 9 which project from the side of one ring and enter openings in the opposing side of the adjacent ring. The several rings 7 and 8 are preferably constructed of cast iron although it is to be understood that they may be formed of any suitable material which is adapted to resist heat and wear, while at the same time preserving an inherent resiliency which is essential in self-adjusting metallic packing. The packing rings 7 are comparatively thick, whereas the confining ring 8 is thin. The combined thickness of the rings 7 and 8 corresponds with the space between the rod 1 and inner walls of the packing box 2. The joints between the rings 7 and 8 and between the sections of the outer rings 7 are closed by the adjacent faces of the packing members 4 and 5. The inner corners 10 of the packing rings 7 are beveled to avoid any possible scraping action on the rod 1.

When the parts comprising the packing are in position, the member 4 is slightly compressed, thereby exerting an endwise pressure upon the improved packing so as to hold the faces of the members 4 and 5 in close contact with the faces at the ends of the improved packing. The sectional packing rings 7, when assembled, are retained in place by means of the confining ring 8 which is slipped thereover and the confining ring 8, together with the packing rings 7, constitutes the composite or improved packing which is confined in the box between the members 4 and 5. The confining ring 8 normally exerts a compressing action on the rings 7, hence the latter are contracted so as to take up any possible wear. It is to be understood that a slight space exists between the sections of each of the rings 7 to admit of such rings contracting to automatically take up wear. The packing being essentially of a metal not affected by extreme heat, it is well adapted for use on superheated locomotives or in like places subjected to high temperature.

Having thus described the invention, what is claimed as new is:—

In combination, a box, an expansible filler at one end of the box having ends disposed in radial planes of the box, a divided joint ring arranged within the opposite end of the box and having an end disposed in a radial plane of the box, an elastic retaining ring fitted around said joint ring, and a composite packing comprising a plurality of sectional packing rings and a confining resilient ring encircling said sectional rings, the confining ring being equal in length to the combined length of the plurality of sectional rings and fitting between the same and the inner wall of the box and the joints between the outermost sectional rings and the confining ring being closed by the expansible filler and the joint ring, the said packing rings having plane-faced ends which abut the end faces of adjoining rings and the ends of the filler and the joint ring, and the bores of said packing rings presenting substantial faces parallel with their axes to have extended flat contact with a rod.

In testimony whereof, I affix my signature.

EDWIN F. MILLER. [L. S.]